United States Patent [19]

Bely et al.

[11] 4,000,430

[45] Dec. 28, 1976

[54] CONTACT BRUSH

[76] Inventors: Vladimir Alexeevich Bely, ulitsa Pushkina, 34, kv. 16, Gomel; Feliks Georgievich Ivannikov, ulitsa Berezovaya roscha, 58, kv. 32, Voronezh; Viktor Mikhailovich Kenko, ulitsa Jubileinaya, 1, kv. 64, Gomel; Evald Akimovich Lodochnikov, ulitsa Kirova, 9, kv. 17, Voronezh; Valentin Georgievich Savkin, ulitsa 50 let BSSR, 15, kv. 6; Anatoly Ivanovich Sviridenok, pereulok Pushkina, 5a, kv. 39, both of Gomel, all of U.S.S.R.

[22] Filed: Feb. 13, 1973

[21] Appl. No.: 332,197

[52] U.S. Cl. .............................. 310/251; 310/252

[51] Int. Cl.[2] .............................. H02K 13/00

[58] Field of Search .......... 310/248, 232, 249, 229, 310/251, 233, 252, 234, 253, 235, 219, 236, 231, 237; 264/104, 108, 272, DIG. 58; 29/195; 260/41 B; 148/104, 105

[56] References Cited

UNITED STATES PATENTS

| | | | |
|---|---|---|---|
| 2,783,405 | 2/1957 | Atkins | 310/253 |
| 2,946,907 | 7/1960 | Titus | 310/253 |
| 3,046,425 | 7/1962 | Millet | 310/251 |
| 3,303,370 | 2/1967 | Boes | 310/252 |
| 3,509,400 | 4/1970 | Conrath | 310/252 |
| 3,510,710 | 5/1970 | McCafferty | 310/253 |
| 3,525,006 | 8/1970 | Parr | 310/252 |
| 3,668,451 | 6/1972 | McNab | 310/251 |
| 3,691,130 | 9/1972 | Logvinenko | 260/41 B |

FOREIGN PATENTS OR APPLICATIONS

| | | | |
|---|---|---|---|
| 1,065,928 | 9/1959 | Germany | 310/253 |

*Primary Examiner*—R. Skudy
*Attorney, Agent, or Firm*—Haseltine, Lake & Waters

[57] ABSTRACT

A contact brush made in the form of a lamination composed of electroconductive foil laminae joined together with an adhesive on the base of a polymeric binder. As a binder use may be made of thermoreactive polymeric resins filled with colloidal metal particles, antifrictional and polish-forming admixtures which impart electric conductivity, high wear resistance and electric contact stability to the adhesive under conditions of elevated humidity and in a vacuum.

The contact brush is intended for use in electrical machines, in particular, electric fractional horsepower motors, measuring potentiometers, start-control devices and the like where it is necessary to provide for a reliable and highly stable sliding electric contact.

5 Claims, 2 Drawing Figures

CONTACT BRUSH

This invention relates to contact brushes used to provide a sliding electric contact, for example, in electrical machines.

The development in the manufacture of contact brushes is mainly aimed at solving the following problems:

minimizing of the ohmic resistance of a brush and a transition contact in the commutation unit;

improvement of the wear resistance of sliding contact surfaces;

minimizing of friction losses at a low friction coefficient;

ensuring of the electric contact stability of contact surfaces both in operation and in a durable static position;

improvement of structural and material strengths in a brush subjected to high acceleration, vibration and shocks.

These problems become especially acute in developing automatic and remote-control systems operating from fractional horsepower motors. Besides, additional difficulties arise in providing reliable starting under varying environmental conditions.

Known in the art are various contact brushes made on a base of graphite which contain conductive and anti-frictional admixtures, e.g., dispersions of metals and metal sulphides. These brushes exhibit satisfactory wear resistance and have a low friction coefficient but they fail to provide for reliable starting of motors after a long stay of the apparatus at an elevated humidity and are unfit to operate in a high vacuum.

The introduction of metal brushes is unable to solve the above problems because of an intensive wear thereof and friction of the sliding surfaces.

Some progress in this field may be achieved by using metal-filled constructions wherein the contact brush is made as a flat roll (pile) of a highly-conductive cloth which is filled with antifrictional admixtures, e.g., molybdenum disulphide and acid-free oils. This prior art embodiment is characterized by the brush and the collector of an electrical machine coming into contact in a plane parallel to the central axis of the flat roll.

The known brushes, however, are disadvantageous in that the true contact area between the collector and the brush tends to vary thus resulting in a change of the electric conductivity, and that the electric resistance of a transition contact is unstable since the heterogeneous material wears out by layers.

It should be noted that the application of woven materials for manufacturing brushes is still unable to preclude the possibility of separating coarse particles in the form of single wire pieces which may occur due to the wear on the brushes and are responsible for disturbing the operation of a collector unit or clogging the bearings.

These disadvantages are also inherent in other known constructions of brushes manufactured on the base of conductive metal grids or cloths.

An object of this invention is to eliminate the above disadvantages in the known brushes and develop a composition of novel positive features which can improve the reliability and useful life of a sliding commutation pair.

In accordance with the present invention there is provided a contact brush for electrical machines, which brush has a laminated member, the lamine of which are made of foil and joined together with an adhesive on the base of a polymeric binder.

The adhesive may contain an electroconductive polymeric binder, e.g., with metal particles in the colloidal state.

It is advisable to use as a polymeric binder thermoreactive polymeric resins, for example, polyvinyl furfural.

It is also a good practice to feed the adhesive with one of the above-mentioned substances as an antifrictional admixture: powdered fluoroplast, graphite, molybdenum disulphide or combinations thereof.

For improving current supply characteristics, it is preferred to provide part of foil laminae with lobes projecting beyond the brush faces and forming a current supply element.

Such an embodiment of contact brushes provides for a high wear resistance and a high electric contact stability under conditions of elevated humidity or in a vacuum.

The nature of the invention will be more fully apparent from the following detailed description of specific embodiments thereof with reference to the accompanying drawings, wherein.

Figure 1:
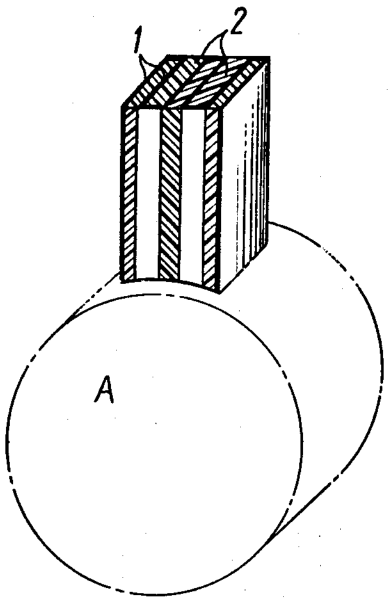
FIG. 1 illustrates a contact brush according to the invention and a circuit diagram of the brush with a collector made, e.g., a rotary sectional cylinder.

Referring now to FIG. 1, the contact brush according to the invention comprises a laminated member whose laminae are made of a highly conductive metal foil 1. The foil laminae 1 are joined together with a polymeric adhesive 2 on the base of a polymeric binder.

The foil laminae 1 form a pile and are joined together, preferably, so that the end surfaces of the foil 1 can make tact with a collector A.

Such an embodiment of brushes provides for a high mechanical strength, an improved electric conductivity and stable properties along the axis of symmetry parallel to the foil placement surfaces. Used as foil materials here may be various highly conductive substances such as copper, silver, aluminum and other metals, as well as alloys thereof depending on the requirements imposed upon the commutation device.

The application of an adhesive on the base of a polymeric binder provides for the required solidity of a brush, eliminates the diffusive metal embrace of the brush and the collector, and, by changing its composition and structure, makes it possible to control the mechanical frictional and electrical properties of contact brushes in a wide range.

Though the application of a polymeric binder in the pure state is effective, in some cases, under certain operating condition for a collector unit, for example, at high sliding velocities, it is unable to provide for a stable resistance of the transition contact between a brush and a collector due to a partial transfer of the polymeric binder to the collector surface and a formation of finest films thereon exhibiting an elevated electric resistance.

According to the present invention, this disadvantage may be eliminated by using an electroconductive polymeric binder.

The electric conductivity of a binder on the base of polymers may be achieved by providing the binder with various electroconductive elements, for example, metal powders in the finely-dispersed state which are to be arranged in the polymeric matrix in a particular manner.

As has been revealed by our investigations, the most effective electroconductive binder, as applied to contact brushes, is a metal in the colloidal state.

The colloidal metal content in a binder may vary within a wide range. The colloidal metal particles may be formed in the adhesive in the process of forming a brush through a thermal destruction of certain metal compounds, preferably, carbonyls and oxalates which are to be preliminarily introduced thereinto. The metal particles being formed in the process of destroying these compounds actively interact with the adhesive and foil, impart a high electric conductivity and a thermal stability to the electric brush, and provide for a pronounced drop in and a stability of the transition resistance of a brush-collector contact due to the polish-forming ability of the electroconductive polymeric binder.

The polish-forming ability becomes manifest as the brushes rub against the collector and resides in that on the working surfaces of the brush and the collector there forms a fine electroconductive layer of colloidal metal particles being in contact in the quasi-liquid state. The presence of a polish layer makes it possible not only to improve and stabilize the electric contact but also to sharply increase the wear resistance of a brush when the collector unit is operated at high atmospheric humidity or in a vacuum.

Taking into account that the electric brushes are to be used under rigid thermodynamic conditions (high local temperatures and high sliding velocities), it is advisable to fill the polymeric binder with a colloidal metal to a maximum, up to 80 and more wieght per cent. In this case, the most suitable polymers are thermoreactive polymeric resins on the base of epoxide phenol-formaldehyde, furan and other polymeric groups.

It should be noted that in the process of solidification of a contact brush, the base of a polymeric binder should have a great quantity of functional links. In particular, good results have been obtained by using polyvinyl furfural as a polymeric binder.

The use of contact brushes manufactured from a silver foil and an adhesive on the base of polyvinyl furfural containing about 85–90 per cent of silver makes it possible to decrease the transition contact resistance of a palladium-plated short-circuited collector up to 3.1 ohms with the working cross-section of a brush being equal to 2×2.5 mm. After a 10-day stay of a collector pair under conditions of elevated humidity (98 per cent) and a temperature of about 40° C, the transition contact value remained low. The resistance stability of a transition contact was also confirmed by using these brushes in d.c. micromotors with copper collectors. The operation of such motors is characterized by the occurence of a polish film which is white-metallic in colour and durably stable under conditions of elevated and variable humidity and temperatures. This assures stable starting of the electric motor at a minimum voltage.

Besides, the wear resistance of a contact brush, according to the invention, and that of the collector unit as a whole are raised by providing the adhesive with antifrictional admixtures in the form of powdered solid lubricants, particularly, of fluoroplast, molybdenum disulphite, graphite and similar substances. The amount of antifrictional admixtures may vary up to 30 per cent of the adhesive weight to suit the operating conditions of frictional pairs. The introduction of one or more lubricating components may be sufficient. Specifically, for the brushes intended for use in a high vacuum it is most advantageous to use molybdenum disulphite or niobium diselenite or a combination thereof, while for the collector unit operating under atmospheric conditions it is rather advisable to introduce finely dispersed graphite.

Figure 2:
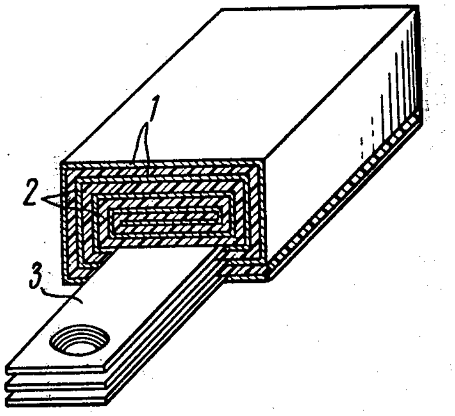
FIG. 2 illustrates the embodiment of a brush made in the form of a wound article with current supply elements to be connected to an electric circuit.

The contact brushes according to the invention exhibit improved commutation properties both at the sliding contact point and at the connection point of a brush with electric circuits. The current supply elements of brushes may be rigidly soldered or welded to the adhesive-free portions of a foil lamina or the whole lamination. It is good practice to use as current supply elements lobes 3 (FIG. 2) of the foil 1 which project beyond the brush faces thus extending individual foil laminae of the brush.

The present invention may be used not only in brush-collector units for electrical machines but in some other cases as well when it is necessary to provide for a reliable and highly stable sliding electric contact, for example, in measuring potentiometers, start-control devices and the like.

This invention makes it possible to improve the operational features of electric contact brushes, increase the efficiency of electrical machines, bring up the reliability and useful life of collector units and thereby ensure a significant economical effect from the use thereof.

What is claimed is:

1. A contact brush preferably for use in electrical machines which comprises a multilayer or laminated packet whose laminae are made of an electroconductive foil and joined together with an adhesive based on an electroconductive thermosetting polymeric binder containing metal particles in a colloidal state therein, the electroconductive thermosetting polymeric binder containing at least 80% by weight of said metal particles in the colloidal state, said foil surrounding said laminate and making contact with said electrical machine along an axis of symmetry to said foil surface.

2. A contact brush as claimed in claim 1, wherein part of foil laminae are provided with lobes projecting beyond the brush faces and forming a current supply element.

3. A contact brush which comprises a multilayer or laminated packet whose laminae are made of an electroconductive foil and joined together with an adhesive based on an electroconductive polymeric binder wherein said electroconductive polymeric binder contains metal particles in the colloidal state and thermosetting polymeric resins are used as said polymeric binder, wherein the thermosetting polymeric resin is polyvinyl furfural having the formula $-(C_9H_{10}O_3)_n-$.

4. A contact brush as claimed in claim 3, wherein said adhesive contains antifrictional additives.

5. A contact brush according to claim 4, wherein one of said antifrictional additives is selected from the group consisting of fluoroplast, graphite, molybdenum disulphide and mixtures thereof.

* * * * *